June 17, 1941.  T. A. RICH  2,246,004
RECORDING APPARATUS
Original Filed Nov. 26, 1938
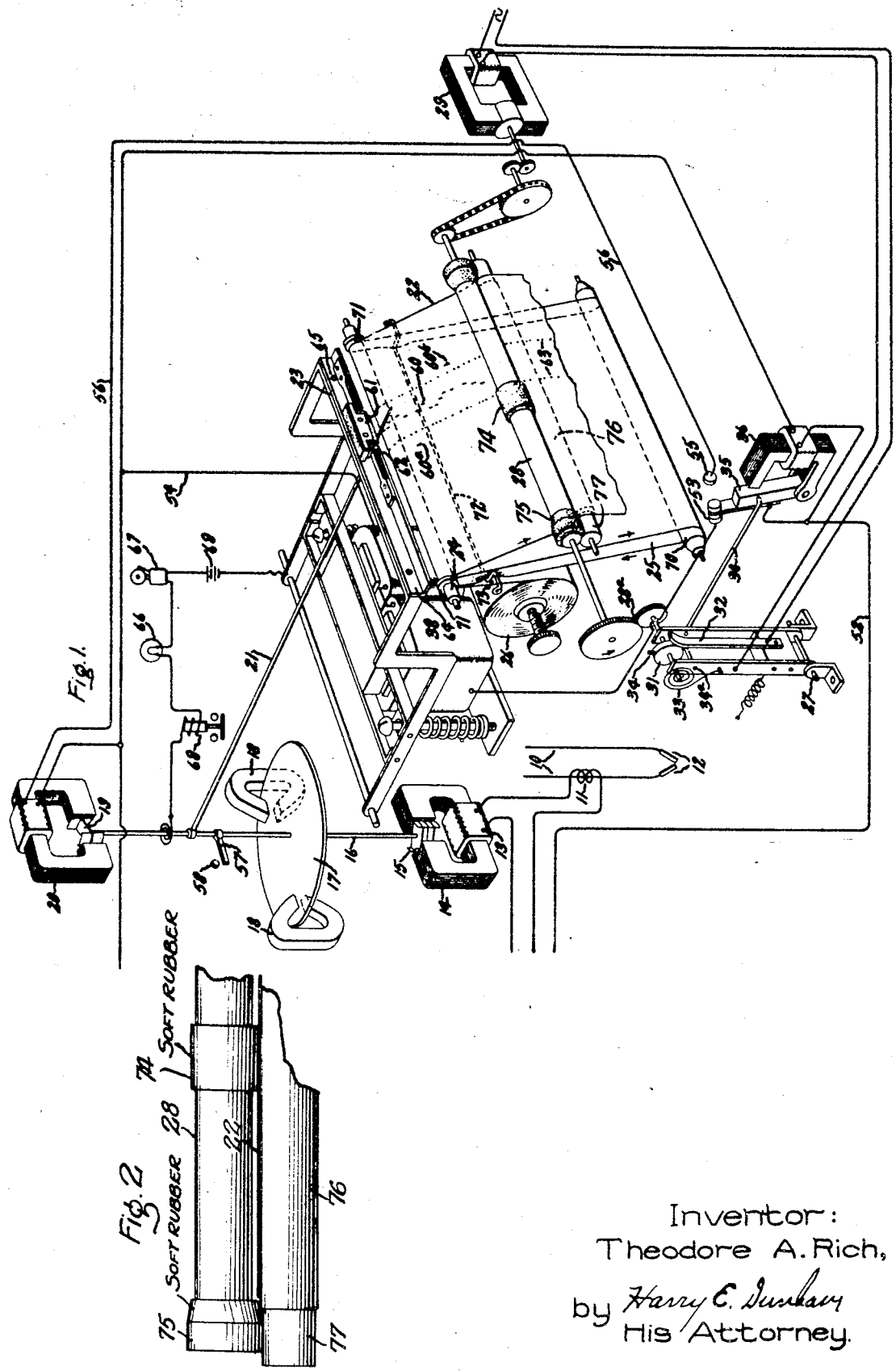
Inventor:
Theodore A. Rich,
by Harry C. Dunlavy
His Attorney.

Patented June 17, 1941

2,246,004

UNITED STATES PATENT OFFICE 2,246,004

RECORDING APPARATUS

Theodore A. Rich, Schenectady, N. Y., assignor to General Electric Company, a corporation of New York Original application November 26, 1938, Serial No. 242,543. Divided and this application December 4, 1939, Serial No. 307,549

1 Claim. (Cl. 271—2.6)

This application is a division of my application S. N. 242,543, filed November 26, 1938 on an impulse measuring and recording apparatus, said parent application containing claims directed primarily to the subject matter of the novel galvanometer described herein. The present application contains claims directed to features for maintaining the recording chart straight as it is advanced. Another divisional application, Serial No. 269,805, filed April 24, 1939 contains claims directed to the novel timing control of the galvanometer recorder. Another divisional application, Serial No. 269,806, filed April 24, 1939 contains claims directed to a novel means for stopping advance of the recording chart when recording operations cease. Another divisional application is being filed concurrently herewith containing claims directed to the features of printing spaced calibration marks on the record sheet when a record is made.

The features of my invention which are believed to be novel and patentable will be pointed out in the claim appended hereto. For a better understanding of my invention reference is made in the following description to the accompanying drawing in which Fig. 1 represents a perspective view of a recording galvanometer embodying my invention and Fig. 2 shows an enlarged view of a portion of the chart-straightening roller embodying my invention.

The galvanometer comprises essentially three parts, first a measuring element energized by coil 13, and having a two-pole stationary magnet 14 and a two-pole magnetic armature 15 secured to the rotary shaft 16; second, a damping element consisting of a disk 17 of conducting material secured to shaft 16 and one or more stationary permanent magnets 18 which convey a damping flux through the disk 17 for damping purposes; and third, a zero return element consisting of a two-pole magnetic vane 19 secured to shaft 16 and a two-pole stationary field magnet 20 which when energized tends to turn its vane 19 into alignment with its pole pieces at approximately the zero position of the shaft 16. A recording arm 21 is secured to shaft 16, and its outer end extends freely between a record sheet 22 and a printing rod 23.

The record printing apparatus may comprise a printing platten 24 in the form of a roller beneath the printing rod 23. About drum 24 is a belt 25 of carbon paper or its equivalent. The record sheet 22 is preferably sufficiently thin as to be transparent so that when the printing rod 23 forces pointer 21 down against the printing platten with the record sheet and carbon paper intervening, a mark is made on the under surface of the record sheet of the position of pointer 21, which mark is visible through the transparent sheet. 26 represents a supply roll for the record sheet, and 28 a driving drum for the record sheet. 29 is a small timing motor used for driving the drum 28 for advancing the chart 22. The advance of chart 22 rotates roller 24 and since the carbon paper belt 25 is about roller 24 in contact with chart 22 the carbon paper belt 25 is also advanced by motor 29. The carbon paper belt 25 is advanced over roller 24 at about the same rate as the record sheet is advanced above it, but, except during the instance of printing, the carbon paper does not transfer marking material to the record sheet.

In order automatically to stop the advance of the record sheet when welding operations are temporarily discontinued, I have provided a special contact device for opening the circuit of the timing motor 29. The contacts of this device comprise a metal wheel 31 and a resilient metal brush 32 bearing against the wheel 31 and included in the circuit of motor 29.

As here shown, the metal wheel 31 is urged in a counter-clockwise direction by a light spiral spring 33 and has an insulating finger 34 extending from its periphery which, if rotated clockwise against the upper end of contact 32, forces the contact away from wheel 31 to open the circuit of the timing motor 29. This contact mechanism is pivotally mounted at 27 and is connected with the armature 35 of a relay 36 by rod 30. This relay 36 is energized following the occurrence of a welding surge as described in my parent application Serial Number 242,543. When the relay 36 is deenergized, the metal wheel 31 is rotated in a clockwise direction since it is on a shaft geared at 28a to the shaft of roller 28 driven by timing motor 29 and in this condition, which is that represented in the drawing, wheel 31 will be driven clockwise so long as the timing motor remains energized through contacts 31 and 32.

It is seen that in a short time interval, if the relay 36 is not energized, insulating finger 34 will rotate against spring finger 32 and move it away from wheel 31 to break the timing motor circuit.

This condition of affairs will remain until relay 36 is energized. When this happens the contact assembly is swung to the right about pivot 27 and the gears at 28a are separated. Now spring 33, which has been wound up, can rotate 31 counter-clockwise until finger 34 is stopped by contact with a stop 34a. Finger 32 is now in contact with wheel 31 and the timing motor starts in operation to advance the record sheet. Ordinarily when surges to be recorded are coming in at a rate of say once per second, the finger 34 does not reach contact 32 but is repeatedly returned against its stop and the timing motor circuit remains energized to advance the record sheet continuously, but as soon as relay 36 remains deenergized for a somewhat longer period, which period may be made anything desired, the timing motor circuit is again opened and remains open until the next surge to be recorded occurs. It will be evident that with this arrangement the record sheet will always be advanced so as to leave a clean portion of the record sheet in recording position when the motor stops and hence the first impulse that comes in and starts the timing motor will be properly recorded. This expedient not only saves considerable recording and carbon paper, but it saves wear and tear on the recording apparatus and useless operation of the timing motor. Delays incident to renewing the recording paper supply are reduced, and the records which are obtained are condensed and easier to study than if scattered over an unnecessary length of record sheet.

The printing rod 23 extends over the recording swing of pointer 21 and may be resiliently suspended and provided with a magnet 38 which will be momentarily energized at the proper time, as hereinafter explained, to perform a recording operation.

The nature of the records obtained is shown by the dots indicated at 60 on record sheet 22. As illustrated, the printing rod 23 is provided with a removable or adjustable section 61 of insulating material such as rubber. At the lateral boundaries of this insulated section there are provided raised printing ridges 62, which, when the printing relay 38 is energized, print boundary lines 63 on the record sheet 22 when the records 60 are printed.

The front section 64 of the printing rod which holds rubber part 61 and the boundary printing ridges 62 is either removable or adjustable. In the example shown, the adjustable part 64 is fastened to the main part 23 of the printing rod by screws 65. When these screws are removed, part 64 with insulating part 61 and the boundary printing ridges may be moved laterally or removed entirely and replaced by another section 64' having the insulated part 61' wider or narrower than the part 61 of Fig. 1 or at a different lateral position or both and with boundary printing ridges 62' at its lateral edges. The boundary printing lines 63 are helpful in the calibration and use of the apparatus. These lines are so spaced with respect to the calibration of the instrument as to mark the upper and lower limits of satisfactory welding surges and so long as the records fall between these lines, as shown for example by the records 60 in Fig. 1, the welder is assured that the welding surges contain the proper amount of heat energy to give satisfactory welds.

If the records 60 go lower as at point 60a or higher as at point 60b than the limits set, it may be assumed that something is wrong with the power control apparatus or the welding apparatus, and the trouble should be located and corrected before further welding operations are made.

If pointer 21 is ouside the boundary limits 62 when a record is made such as at 60a or 60b, the pointer is opposite a conducting portion of the printing rod and an electric contact is made between the metal pointer and metal rod at the instant of printing. This contact arrangement is included in a circuit which may include one or more of the following: a visual signal 66, an audible signal 67, a control relay 68, as well as a source of supply 69. The relay 68 may be arranged to shut off the power supply to the welder so that no further use thereof may proceed until the apparatus has been checked and the condition corrected. When the pointer is opposite the insulated part 61 when the record is printed the lower edge of the insulated part strikes the pointer and hence the signal or control circuit is not energized for satisfactory welding surges. The connection of the signalling circuit to the recording pointer shaft should be through a connection such as a weak spiral which has negligible turning effect on the shaft in any position.

In order to avoid trouble with the carbon paper belt 25 and record paper 22, I have found that certain precautions are very desirable. It is difficult to provide a carbon paper or cloth belt 25 of exactly the same length at both ends. For example, the belt may be formed by a sheet of carbon paper of the desired width and length which, when the ends are pasted together, form a belt. In pasting the ends of the sheet together to form a belt, one peripheral side of the belt may be found to be $\frac{1}{16}$ inch longer than the other in spite of care being taken to prevent any such discrepancy. Such a belt when simply placed on parallel rollers such as the rollers 24 and 70 and driven as here contemplated, will not run true but will invariably work endwise towards that end of the belt which is the longest. Even collars such as collars 71 shown at the ends of roller 24 will not prevent an uneven belt of carbon paper from working endwise and climbing out over such collar. This troublesome difficulty has been overcome by the use of a wrinkle bar 72 having bends 73 beneath the paper belt near the ends of such belt where it is fed onto roller 24. These bends crowd the end edges of the paper belt inward and cause it to wrinkle up slightly just as it passes into platen roller 24 and the belt is made sufficiently loose to permit this without tearing. When the belt passes over roller 24, the chart paper 22 is outside and under sufficient tension to drive the carbon paper belt and to flatten out the wrinkles in and without causing creasing of the carbon paper. This pressing and driving action of chart 22 on the carbon paper over a limited periphery of roller 24 allows the belt to adjust itself, the wrinkles in the long end of the belt apparently being pressed out in a forward direction and the wrinkles in the short end of the belt apparently being pressed out in a retarding direction to the extent necessary to allow an uneven belt to be driven without working endwise. Actually, the long end of the belt is driven faster than the short end, due to the adjustment allowed incident to the smoothing out of the wrinkles to the extent necessary to compensate for the difference in peripheral length of the belt at its opposite ends.

The chart 22 used is a relatively thin lightweight paper in order that it will be sufficiently transparent to enable the records, which are made on the under side of the chart, to be clearly visible therethrough. It is impracticable to drive such a chart with a toothed drum having driving teeth projecting through holes punched along the edges of the chart. The chart driving arrangement used, and which has been referred to generally above as a driving drum 28, requires some further explanation. The driving drum 28 may be constructed as indicated in Fig. 2, having a soft rubber cylindrical driving section 74 at its center and soft rubber inwardly tapered guiding sections 75 at its two ends. The remainder of this drum is made of reduced diameter and may be made up of metal parts which serve as supporting and spacing parts, but do not enter into driving contact with the paper. Beneath driving drum 28 is another drum made up of a long central part 76 and short end parts 77. These three parts are so supported as to be freely rotatable independently of each other. Part 76 is pressed in driving contact with section part 74 of drum 28 and the chart is gripped between these two parts and they constitute the main driving elements of the arrangement. End roller parts 77 are slightly smaller in diameter than part 76 and they are in driving contact with the outer cylindrical portions of section guide roller parts 75. The maximum diameter of parts 75 is slightly greater than the diameter of cylindrical part 74, but the minimum diameters of these parts are the same. The chart is of a width equal to the distance between the inner ends of parts 75 and is normally driven in a central position with its end edges in line with the inner ends of the parts 75. In case the chart tends to creep towards one side or the other of such central position, one edge rides on the cone-shaped surface of part 75 and there is an immediate tendency for such edge to be driven faster than the middle of the chart due to the increased diameter of part 75 and the fact that parts 74 and 75 are driven at the same speed. This straightens the chart and returns it to a central driving position. This correcting effect of the cone-shaped roller parts 75 at any instant is in proportion to extent of chart displacement from a central position at the driving drum. Guide collars 71 maintain the chart properly centered under the recording position and hence such correcting effects as occur at the driving drum do not displace the record on the chart.

What I claim as new and desire to secure by Letters Patent of the United States is:

In a recording instrument, a pair of rollers for supporting a record sheet and between which such record sheet is gripped to pull the record sheet forward, a motor for driving one of said rollers, said last mentioned roller having an enlarged friction driving portion at its center and inwardly tapered cone-shaped chart straightening friction sections at its ends, the inner ends of said cone-shaped sections having a diameter not greater than and approximately equal to the center driving portion and a spacing approximately equal to the width of the chart, the other roller of said pair having a central diameter such that a chart will be gripped between it and the central driving section of the driving roller and end sections of reduced diameter opposite the cone-shaped end sections of the driving roller, said reduced end sections having a driving contact with the largest parts of the cone sections and being rotatable independently of the central section of the same roller.

THEODORE A. RICH.